(12) United States Patent
Bae (10) Patent No.: US 8,582,564 B2
(45) Date of Patent: Nov. 12, 2013

(54) METHOD FOR PROVIDING A ROAMING SERVICE BETWEEN HETEROGENEOUS NETWORKS AND SYSTEM THEREFOR

(75) Inventor: Su Jin Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 13/121,495

(22) PCT Filed: Sep. 24, 2009

(86) PCT No.: PCT/KR2009/005461
§ 371 (c)(1),
(2), (4) Date: Jun. 24, 2011

(87) PCT Pub. No.: WO2010/036043
PCT Pub. Date: Apr. 1, 2010

(65) Prior Publication Data
US 2011/0249661 A1  Oct. 13, 2011

(30) Foreign Application Priority Data
Sep. 29, 2008  (KR) .......................... 10-2008-0095481

(51) Int. Cl.
*H04L 12/66* (2006.01)
(52) U.S. Cl.
USPC ........................................ 370/352; 370/401
(58) Field of Classification Search
USPC ......... 370/328, 329, 331, 341, 351–356, 400, 370/401
See application file for complete search history.

(56) References Cited

U.S. PATENT DOCUMENTS

| | | | |
|---|---|---|---|
| 6,081,518 A * | 6/2000 | Bowman-Amuah | 370/352 |
| 6,101,182 A * | 8/2000 | Sistanizadeh et al. | 370/352 |
| 6,683,881 B1 | 1/2004 | Mijares et al. | |
| 7,130,807 B1 * | 10/2006 | Mikurak | 705/7.25 |
| 2002/0141358 A1 * | 10/2002 | Requena | 370/329 |
| 2002/0181683 A1 * | 12/2002 | Mani | 379/201.01 |
| 2003/0027569 A1 * | 2/2003 | Ejzak | 455/432 |
| 2003/0027595 A1 * | 2/2003 | Ejzak | 455/560 |
| 2009/0323636 A1 * | 12/2009 | Dillon et al. | 370/331 |

FOREIGN PATENT DOCUMENTS

| | | |
|---|---|---|
| KR | 10-2007-0046884 A | 5/2007 |
| KR | 10-2008-075533 A | 8/2008 |

* cited by examiner

*Primary Examiner* — Kerri Rose
(74) *Attorney, Agent, or Firm* — Jefferson IP Law, LLP (57) ABSTRACT

A roaming service providing method and a system thereof are provided. The communication network system providing an inter-network roaming service, includes: a packet service network providing a packet based service; a circuit service network providing a circuit based service; and a roaming gateway acquiring and authenticating a service profile of a first terminal in the packet service network when the first terminal requests registration to the circuit switching network, and converting and providing the service profile into a protocol of the circuit service network such that the circuit service network registers the first terminal.

10 Claims, 5 Drawing Sheets

METHOD FOR PROVIDING A ROAMING SERVICE BETWEEN HETEROGENEOUS NETWORKS AND SYSTEM THEREFOR

BACKGROUND OF THE INVENTION

1. Field of the Invention

The present invention relates to a roaming service providing method and system, and more particularly, to an inter-network roaming service providing method and a system thereof.

2. Description of the Related Art

Roaming is a service that also allows a user to perform communication in service zones of different communication enterprisers. For example, there are two PCS portable phone enterprisers in Korea. The two PCS portable phone enterprisers construct respective separate service networks. Accordingly, the respective enterprisers may have excellent service zones and bad service zones. In this case, it would be convenient for different enterprisers to contract such that users may have a service of excellent quality by connecting service networks to each other although users join in any enterprisers as members. A roaming service is a service that extends quality and areas of a service by contracting communication enterprisers.

An existing roaming service in a communication network provides a voice service through roaming between enterprisers (e.g., Korean-Japanese 3G network enterprisers) using the same access technology or CS network enterprisers (e.g., GSM-WCDMA enterprisers or CDMA-WCDMA enterprisers) using different access technologies.

The existing roaming service has provided only roaming between enterprisers providing the foregoing technology and CS network enterprisers. However, as a network is gradually expanded to an IP and an IP based voice service has been extended, there is a need for a method that allows a subscriber receiving a voice service with the same terminal to roam to a CS network of another enterpriser in another zone for receiving the voice service.

SUMMARY OF THE INVENTION

The present invention has been made in view of the above problems, and provides a method capable of providing a roaming service between a packet service network and a circuit service network, and a system thereof.

The present invention further provides a method capable of providing a roaming service between different networks of different enterprisers.

In accordance with an aspect of the present invention, a communication network system providing an inter-network roaming service, includes: a packet service network providing a packet based service; a circuit service network providing a circuit based service; and a roaming gateway acquiring and authenticating a service profile of a first terminal in the packet service network when the first terminal requests registration to the circuit switching network, and converting and providing the service profile into a protocol of the circuit service network such that the circuit service network registers the first terminal.

In accordance with another aspect of the present invention, a method for providing a roaming service between a packet service network providing a packet based service and a circuit service network providing a circuit based service, includes: requesting registration in the circuit service network by a first terminal of the packet service network; requesting authentication of the first terminal to a roaming gateway by the circuit service network; and acquiring and authenticating a service profile of the first terminal from the packet service network, and converting and providing the acquired service profile into a protocol of the circuit service network by the roaming gateway such that the circuit service network registers the first terminal.

In the present invention, a terminal user may perform a voice call in an IMS network and a CS network of another enterpriser in another zone. Furthermore, when an IMS enterpriser and a CS enterpriser contract a roaming agreement to provide a voice service, a terminal user may receive a roaming service between an IMS network and a CS network of different zones or enterprisers using a new one IMS terminal throughout the world. Accordingly, a roaming service may be provided to subscribers using one terminal throughout the world, and discriminating functions for attracting subscribers may be provided to a new IMS enterpriser.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
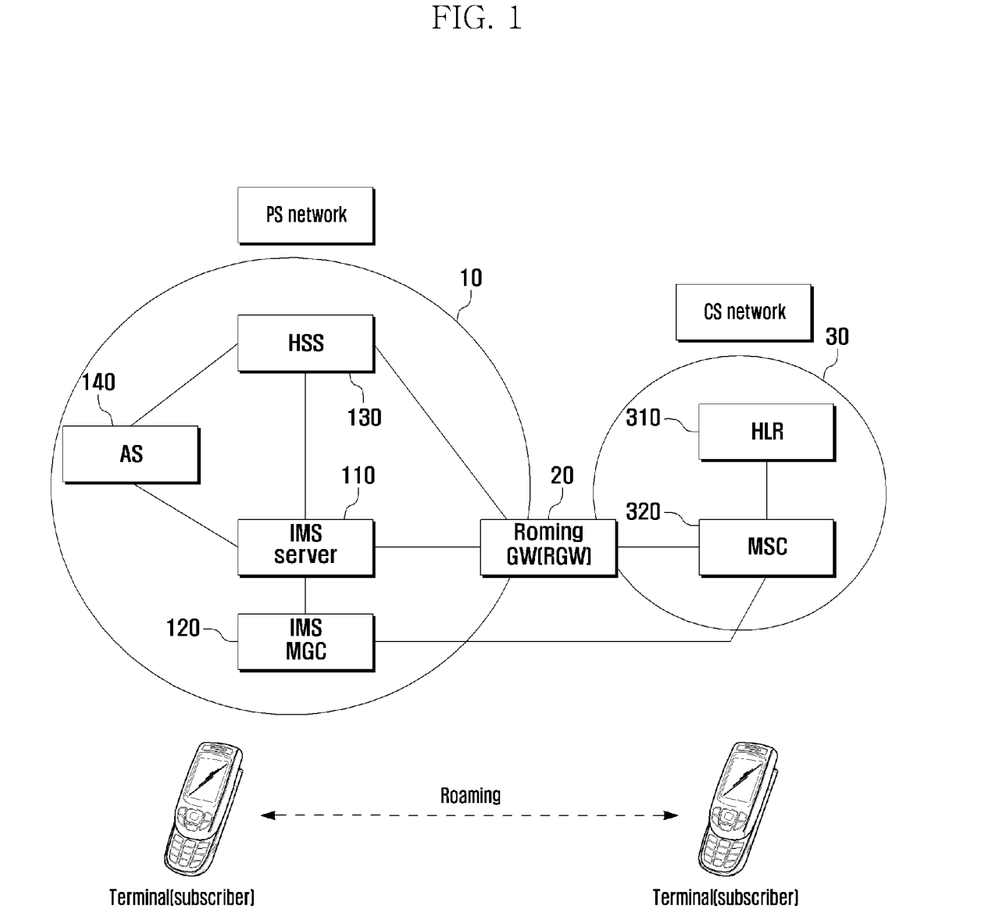
FIG. 1 is a view illustrating a configuration of a wireless network system according to an exemplary embodiment of the present invention.

First, a wireless network system according to an exemplary embodiment of the present invention will be described. FIG. 1 is a view illustrating a configuration of a wireless network system according to an exemplary embodiment of the present invention. The wireless network system according to an exemplary embodiment of the present invention includes different core networks 10 and 30, and a roaming gateway (referred to as "RGW" hereinafter) 20 connecting the different core networks 20 and 30 to each other.

The core network includes a packet service (referred as to "PS") network 10 configured by a packed based network and a circuit service (referred to as "CS") network 30 configured by a circuit based network. Here, there is an IP Multimedia Subsystem (IMS) core network as an example of the PS network. There is a $2^{nd}$ Generation, $3^{rd}$ Generation (2G/3G) network as an example of the CS network.

A terminal 10 may connect with a core network through a base station and a base station controller being wireless zone devices to connect with the two different types of networks. The base station and the base station controller are the wireless zone devices that cause a terminal to approach to a core network based on a wireless zone protocol. This may be changed according to a wireless zone protocol. The base station and the base station controller may be a Radio Access Station (RAS) and an Access Control Router (ACR), a Base station Transceiver System (BTS) and a Base Station Controller (BSC), or a Node B and a radio network controller (RNC). In this case, it is assumed that the BSC is not included in a MSC.

Hereinafter, to avoid obscurity of a subject matter in the present invention, a detailed description of the wireless zone devices is omitted. However, the terminal connects with a PS network 10 or a CS network 30 being a core network through the foregoing wireless zone devices. That is, a terminal (subscriber) according to an embodiment of the present invention receives a packet based Voice over IP (VoIP) from the PS network 10 and a circuit based voice service from the CS network 30.

The PS network 10 is a core network infra capable of providing various multi-media services based on an Internet Protocol (IP). For example, the PS network 10 may include a PS network based on Mobile WiMAX, WCDMA HSDPA, or CDMA EvDO.

Hereinafter, an IP Multimedia Subsystem (IMS) network is described as an example of the PS network. The PS network 10 includes an IMS server 110, an IMS-Media Gateway Controller (referred to as "IMS-MGC" hereinafter) 120, a Home subscriber server (referred to as "HSS") 130, and an Application Server (referred to as "AS") 140. In a side of the PS network, the PGW may be a type of the AS 140.

The IMS server 110 performs a call process and a service matching process for a subscriber when the subscriber receives a service from the PS network 10. The IMS server 110 has a Call Session Control Function (CSCF) and a Breakout Gateway Control Function (BGCF) in a PS network defined in 3rd generation partnership project (3GPP) standard. Here, the CSCF includes a P-CSCF, an I-CSCF, and an S-CSCF. Further, the IMS server 110 downloads a subscriber profile from the HSS 130 to perform call and service processes and cooperates with the AS 140 for providing a service.

The MGC 120 converts circuit based traffic into an IP based packet traffic or the IP based packet traffic into the circuit based traffic. Accordingly, The MGC 120 interfaces between the CS network being a circuit service network and the PS network 10 being a packet network. The MGC 120 connects a call through routing information of a roaming terminal.

The HSS 130 performs mobility management of subscribers and authenticates the subscribers. Moreover, the HSS 130 stores a service profile of a PS network 10 subscriber. Accordingly, the HSS 130 stores an address of the AS 140 providing services by subscribers and reports the address of the AS 140 to the IMS server 140 for providing a corresponding service of the AS 140. The HSS 130 stores information regarding a roaming subscriber and cooperates with the RGW 20 to exchange the information regarding a roaming subscriber. In this case, the HSS 130 manages the RGW 20 as the AS 140 providing the roaming service.

For the roaming service, when the subscriber roams from a previous PS network 10 to the CS network 30, the HSS 130 manages a corresponding subscriber as an unregistered state. When the subscriber restores from the CS network 30 to the PS network 10, the HSS 130 again registers a corresponding subscriber to manage the subscriber as a registered state.

The roaming subscriber needs a service profile to be registered in a roaming network (CS network). Accordingly, the HSS 130 provides a service profile of a subscriber roaming in the CS network through the RGW 20.

When there is a call connection request requesting call connection to the roaming subscriber, the IMS server 110 requests a roaming number of a corresponding terminal to the RGW 200 for the call connection and receives the roaming number from the RGW 200.

The AS 140 provides various multimedia services to a PS network 10 subscriber. There are a transmission number related service, a call waiting service, a call hold service, a call switching service, a call transfer service, a call close service, a malicious transmission number, a legal tapping service, a service guide, a conference call service, a voice mail box, character and voice conversion, a location based service, SMS, MMS, a presence service, and an instant messaging service as examples of the various multimedia services.

The CS network 30 is a CS based network, which may be a 2G network or a 3G network. The CS network 30 according to an embodiment of the present invention includes a Home Location Register (referred to as "HLR" hereinafter) 310 and a Mobile Switching Center (referred to as "MSC" hereinafter) 320. In a side of the CS network, the RGW 20 functions as the HLR 310. That is, the RGW 20 manages roaming subscribers.

The MSC 320 performs a call process and a service matching process for a subscriber when the subscriber receives a service from the CS network 30 of 2G or 3G, and downloads a subscriber profile from the HLR 310 to perform call and service processes. The MSC 320 stores an address of the RGW 20 as an address of the HLR for registering and authenticating roaming subscribers groups according to a roaming agreement. Accordingly, when a roaming subscriber requests a registration, the MSC 320 performs authentication through the RGW 20 and receives a service profile.

The HLR 310 stores a service profile of a CS network 30 subscriber and types of services provided by subscribers of the CS network 30 and a service matching address.

The RGW 20 is a gateway that cooperate the PS network 10 and the CS network with each other to provide services. The RGW 20 executes protocol conversion and cooperation functions according to different protocols between the PS network 10 and the CS network 30. That is, the RGW 20 provides an MAP protocol for cooperating with an MSC 320 of the CS network 30, an SIP protocol for cooperating with an IMS server 110 of the PS network 10, and a diameter protocol for cooperating with an HSS 130 of the PS network 10. The RGW 20 matches identifier information of a roaming terminal in the PS network 10 with that in the CS network 30 and stores the matched information. Here, the identifier (ID) information in the PS network 10 may contain IMS Private User Identity (PRID) or IMS Public User Identity (PUID). The ID information of the CS network 30 may use a Mobile Station International ISDN Number (MSISDN) or Mobile Subscriber ISDN Number (MSISDN), Mobile International ISDN Number (MSISDN), or International Mobile Station Identity (IMSI) as a permanent ID. The ID information of the CS network 30 may use a Temporary Mobile Subscriber Identity (TMSI) or a SAE-Temporary Mobile Subscriber Identity (S-TMSI) as a temporary ID.

The RGW 20 functions as the HLR 310 in a side of the CS network 30. That is, the RGW 20 provides registration and authentication information of a terminal roaming to the CS network 30 to the MSC 320. When the RGW 20 receives a request for a registration or authentication of a terminal roaming to the CS network 30 from the MSC 320, it receives authentication confirmation and a service profile of a terminal roaming to the HSS 130 through a query, and provides the received authentication confirmation and service profile to the MSC 320.

In addition, the RGW 20 functions as an AS 140 providing a service in a side of the PS network 10. Namely, the RGW 20 provides a roaming service to the PS network 10. In this case, when the RGW 20 receives call connection with a roaming terminal, it provides routing information of the roaming terminal to the PS network 10.

Figure 2:
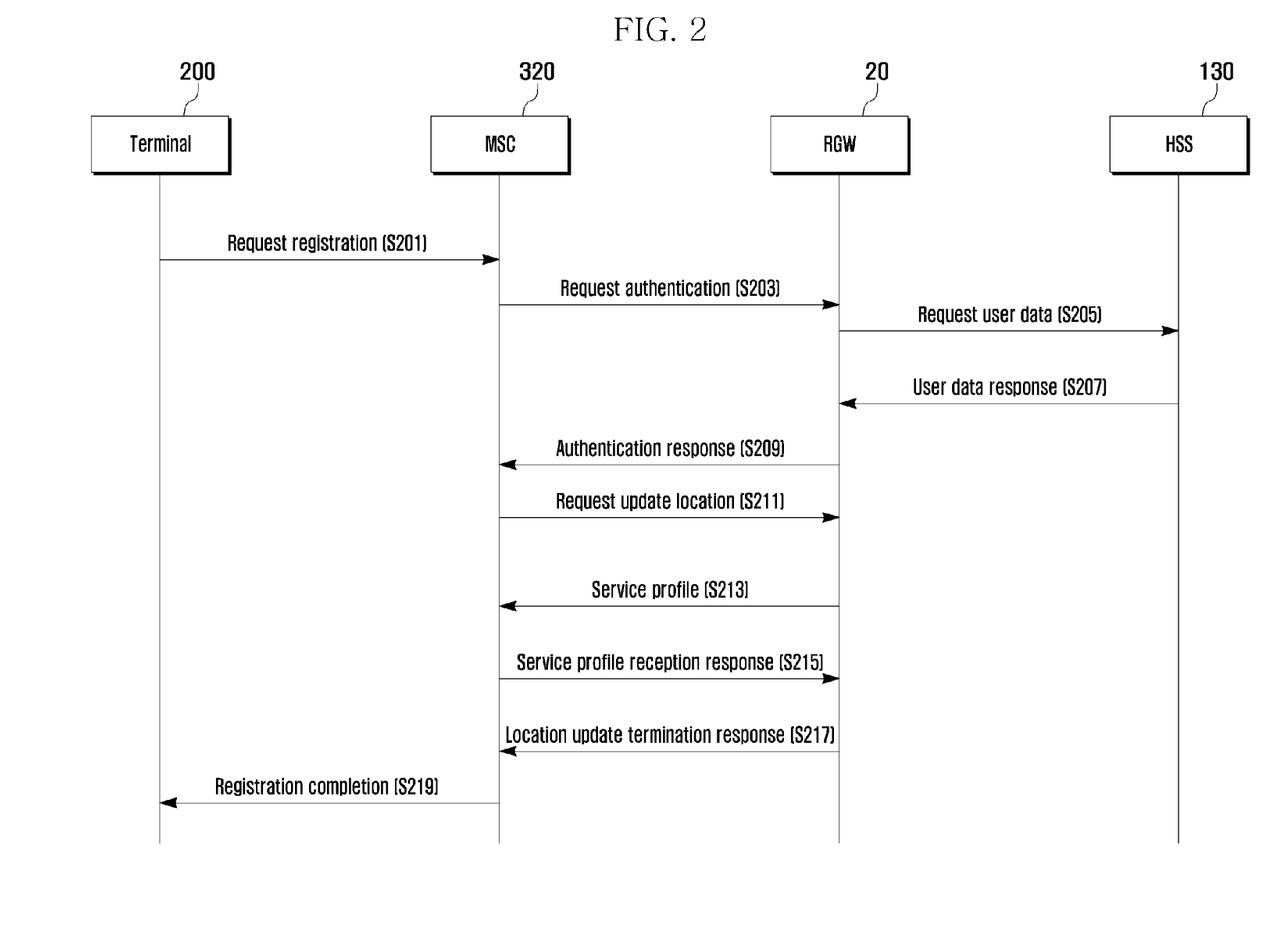
FIG. 2 is a scheme diagram illustrating a registering method of a terminal to another network according to an exemplary embodiment of the present invention.

First, a method registering a terminal in the CS network 30 will be described. FIG. 2 is a scheme diagram illustrating a registering method of a terminal to another network according to an exemplary embodiment of the present invention.

Referring to FIG. 2, a terminal is a terminal 200 receiving a service from a PS network 10. In this case, it is assumed that the terminal 200 roams to a CS network 30 of another enterpriser.

When power of the terminal 200 is turned-on, the terminal 200 request CS Registration with IMSI to the CS network (S201). At this time, the terminal 200 transmits ID information of a corresponding terminal to an MSC 320. The ID information of the terminal 200 contains information to distinguish the terminal of the PS network 10 from a terminal of the CS network 10. In this case, the terminal 200 may perform registration using a permanent ID or a temporary ID as ID information of the terminal 200. An MSIDSN or an IMSI may be used as the permanent ID and a TMSI or an S-TMSI may be used as the temporary ID. The ID information uses ID distinguished from that of a subscriber (terminal) of the CS network 30.

When the MSC 320 receives a registration request, it determines whether to request registration and authentication through ID information of the terminal 200. Namely, the MSC 320 may recognize that a corresponding terminal is a terminal 200 roaming in another network through ID information thereof. Accordingly, the MSC 320 requests authentication to the RGW 20 for authenticating a corresponding terminal 200 (S203)

Next, the RGW 20 transmits a message User_Data_Request request user data to the HSS 130 (S205). That is, the RGW 20 requests a service profile of a roaming terminal. Accordingly, the HSS 130 recognizes that a corresponding terminal is a subscriber terminal roaming to the CS network 30 and transmits a request message User_Data_Response transferring user data with a service profile to the RGW 20 (S207).

When the RGW 20 receives the user data, it may recognize whether the corresponding terminal 200 is a subscriber terminal registered in a roaming service.

When the corresponding terminal is a subscriber terminal registered in a roaming service based on a service profile, the RGW 20 performs authentication. As illustrate above, when the authentication is succeeded, the RGW 20 transmits an authentication response message indicating authentication success to the MSC 320 (S209).

As described previously, when the authentication is achieved, the MSC 320 requests update location to the RGW 20 (S211).

According to the request of update location, the RGW 20 transmits a service profile (Insert Subscriber Data) of a corresponding terminal subscriber to the MSC 320 (S213). At this time, the RGW 20 converts a service profile received from the HSS 130 into a profile form recognizable in the CS network 30, and transmits the service profile. For example, the RGW 20 may convert the service profile received from the HSS 130 into a 3G MAP when the CS network 30 is a 3G WCDMA network. When the CS network 30 is a CDMA network, the RGW 20 may convert the received service profile into an IS-41 MAP. When the CS network 30 is a GSM, the RGW 20 may convert the received service profile into a GSM MAP.

Upon receiving the service profile, the MSC stores the received service profile and transmits a response ACK informing reception of the service profile (S215). When the RGW 20 receives the response, the RGW 20 transmits a update location completion response ACK indicating that the update location is complete to the MSC 320 (S217). Accordingly, the MSC 320 transmits a registration OK message to the terminal 200 (S219).

As illustrated earlier, in a side of the CS network 30, the RGW 20 functions as an HLR 310 of roaming terminals. For this reason, a terminal roaming from the PS network 10 to the CS network 30 may perform registration and authentication without help of an HLR 310 of the CS network 30. That is, in an embodiment of the present invention, an enterpriser of a different network may also perform registration and authentication through the RGW 20 in different zones or enterprisers.

When the registration and the authentication are achieved through the foregoing procedures, a corresponding terminal may communicate with using the CS network 30. The following is a description of a communication method of a terminal registered in the CS network 30.

Figure 3:
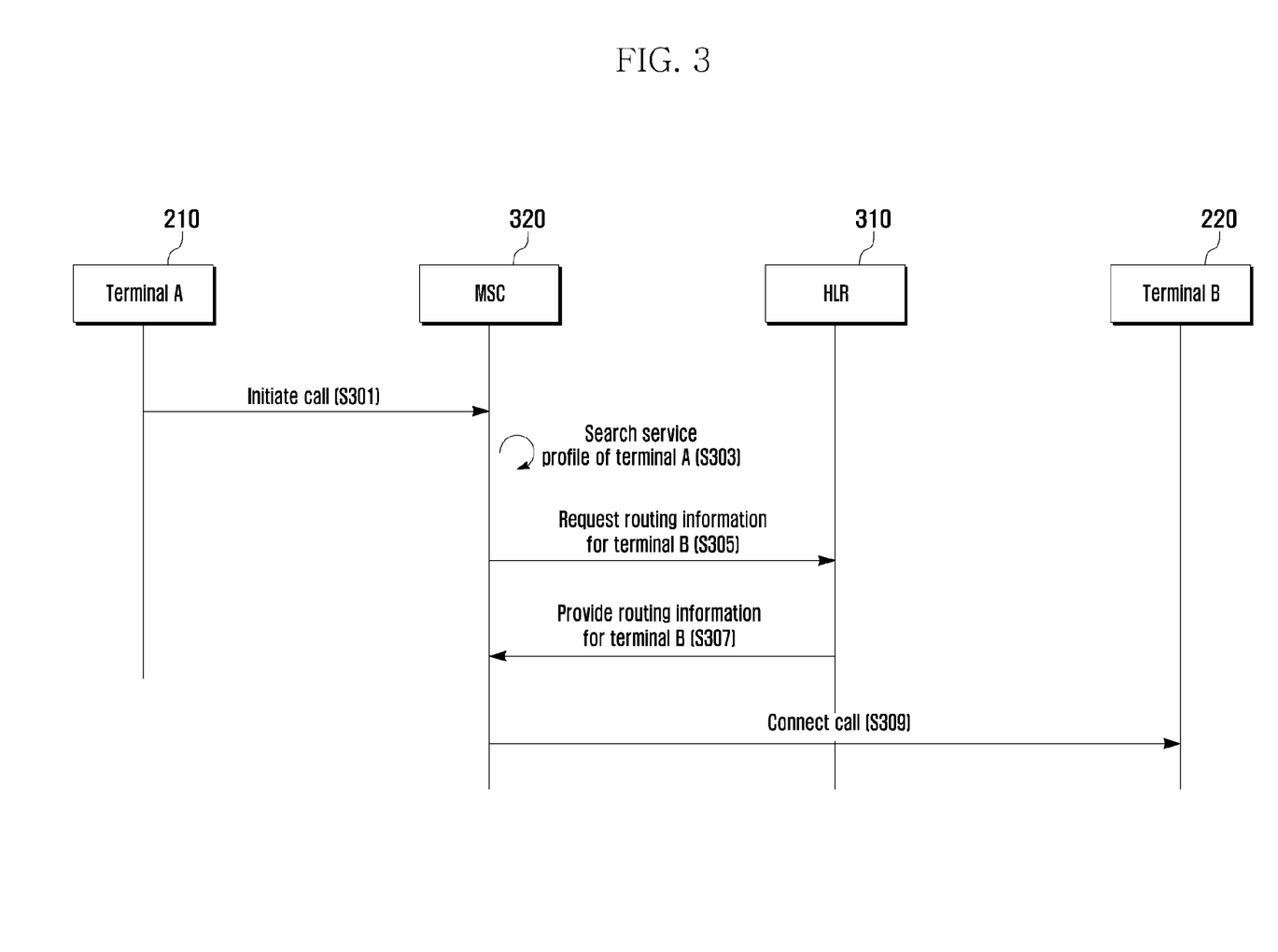
FIG. 3 is a scheme diagram illustrating a communication method of a terminal roaming to another network according to an exemplary embodiment of the present invention.

First, a communication method between a terminal roaming to a CS network 30 and a terminal of the CS network 30 will be described.

FIG. 3 is a scheme diagram illustrating a communication method of a terminal roaming to another network according to an exemplary embodiment of the present invention.

In FIG. 3, it is assumed that a terminal A 210 is a terminal roaming from the PS network 10 to the CS network 30 and a terminal B 220 is a terminal of the CS network 30.

Referring to FIG. 3, the terminal A 210 initiates a call to the CS network 30 for call connection with the terminal B 220 (S301). Upon the call initiation, the terminal A 210 transmits an ID number (transmission number) of the terminal A 210 and an ID number (reception number) of the terminal B 220 to an MSC 320.

Accordingly, the MSC 320 searches a stored service profile of the terminal A 210 (S303). Here, as illustrated in FIG. 2, the service profile of the terminal A 210 is received and stored by the MSC 320 from the PS network 10. Accordingly, the MSC 320 recognizes that a dialed number is for a terminal included in its network, and then requests routing information for the terminal B 220 to an HLR 310 (S305). Next, the HLR 310 provides the routing information for the terminal B 220 to the MSC 320 (S307). When the MSC 320 receives the routing information for the terminal B 220, it requests call connection with the terminal B 220 according to the routing information received from the HLR 310 (S309). Consequently, call connection may be achieved between the terminal A 210 and the terminal B 220.

Figure 4:
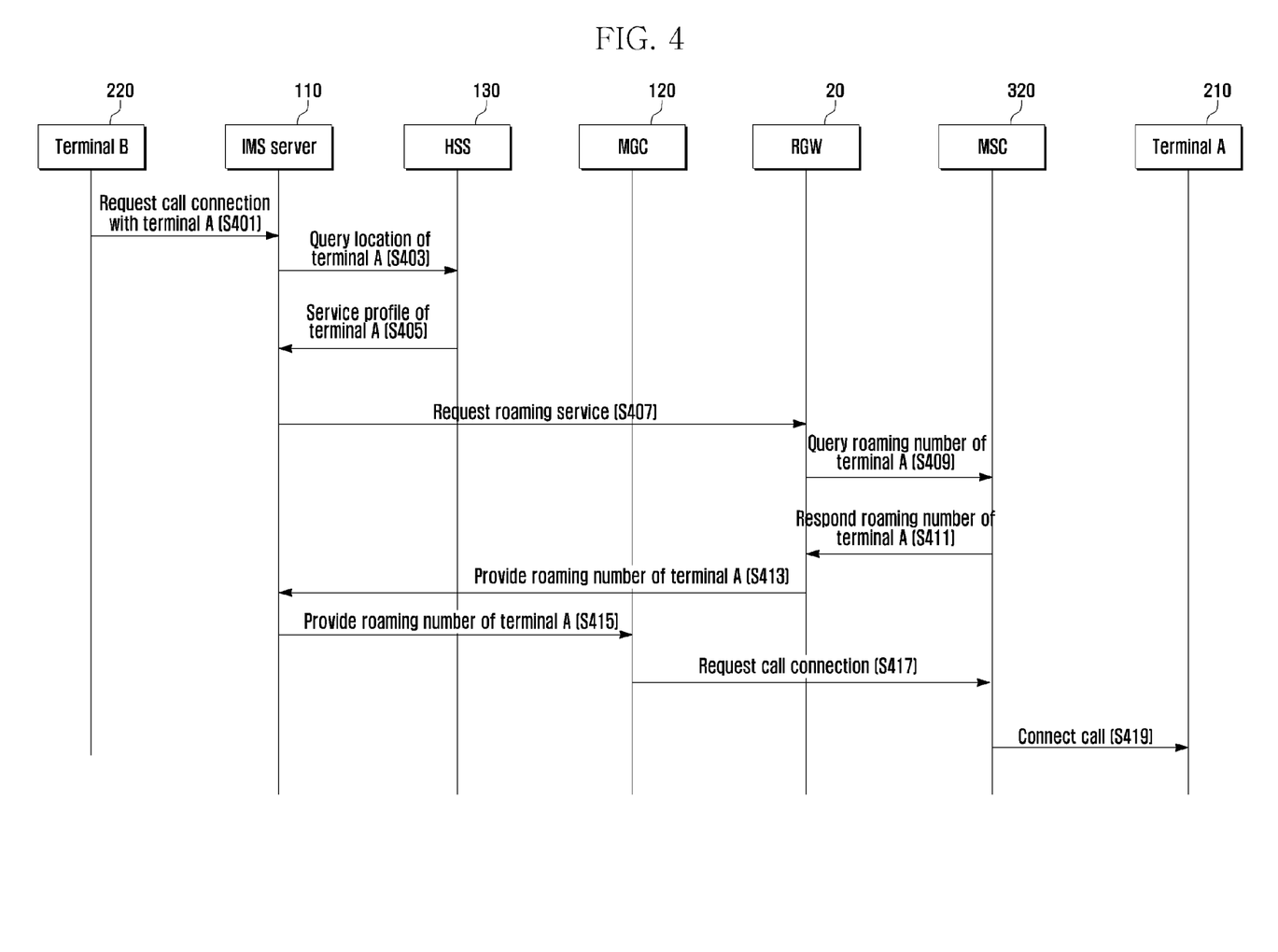
FIG. 4 is a scheme diagram illustrating a communication method of a terminal in another network according to an exemplary embodiment of the present invention.

The following is a communication method between a terminal of the PS network 10 and a terminal roaming to the CS network 30. To connect a call with a roaming terminal, presence of roaming of the terminal is checked. When the terminal roams, routing information should be acquired. Subsequently, call connection should be performed using the acquired routing information. This procedure will be explained. FIG. 4 is a scheme diagram illustrating a communication method of a terminal in another network according to an exemplary embodiment of the present invention.

In FIG. 4, it is assumed that a terminal A 210 is a terminal roaming from a PS network 10 to a CS network 30 and a terminal B 220 is a terminal of the PS network 10.

Referring to FIG. 4, when the terminal B 200 requests call connection with the terminal A 210 to an IMS server 110 (S401), the IMS server 110 queries the HSS 130 to obtain a location of the terminal A 210 (S403). In this case, it is preferred that the IMS server 110 performs a query to the HSS 130 using a diameter protocol. Upon a request of call connection, the terminal B 220 provides ID information of the terminal B 220 and ID information of the terminal A 210 to the IMS server 110, and the IMS server 110 queries to HSS 130 using the ID information of the terminal A 210.

When the HSS 130 receives the query, it may recognize that the terminal A moves to the CS network 30 according to ID information of the terminal A 210. As illustrate previously, the HSS 130 may record and store a service profile of an IMS subscriber roaming to the CS network 30 as an unregistered state or a roaming state.

Accordingly, the HSS 130 may recognize presence of roaming of a corresponding terminal through a service profile in an unregistered state mapped to a call reception number. Next, the HSS 130 provides a service profile to the ISM server 110 as a response to a location of the terminal A 210 (S405). In this case, the service profile is to trigger a roaming service of the RGW 20.

The IMS server 110 requests a roaming service to the RGW 20 using the received service profile (S407). The request for the roaming service is to request routing information to the RGW 20. The routing information may be a roaming number MSRN.

Since the RGW 20 functions as an HLR 310 in a side of the CS network 30, it recognizes that the terminal A 210 roams to the CS network 30 and queries a roaming number of the terminal A 210 to the MSC 320 for acquiring the roaming number (S409). Here, the roaming number may be a Mobile Station Routing Number (MSRN). When the MSC 320 receives the query for the roaming number, it responds the roaming number of the terminal A 210 to the RGW 20 (S411). The RGW 20 provides a roaming number of the terminal A 210 to the IMS server 110 (S413).

Subsequently, the IMS server 110 provides the received roaming number of the terminal A 210 to the MGC 120 such that the MGC 120 performs call connection with the CS network 30 (S415). As illustrated previously, the MGC 120 converts a circuit based traffic into an IP based packet traffic or the IP base packet traffic into the circuit based traffic to interface between a CS network and a PS network. Next, the MGC 120 requests call connection to the MSC 320 using the roaming number received from the IMS server 110 (S417). The MSC 320 connects a call to the terminal A 210 (S419).

As illustrated above, in a side of the PS network 10 acts as a type of an application providing a roaming service to roaming terminals. That is, the RGW 200 provides routing information of the CS network 30 to the PS network 10 such that a terminal of the PS network 10 may dial to the CS network 30.

Figure 5:
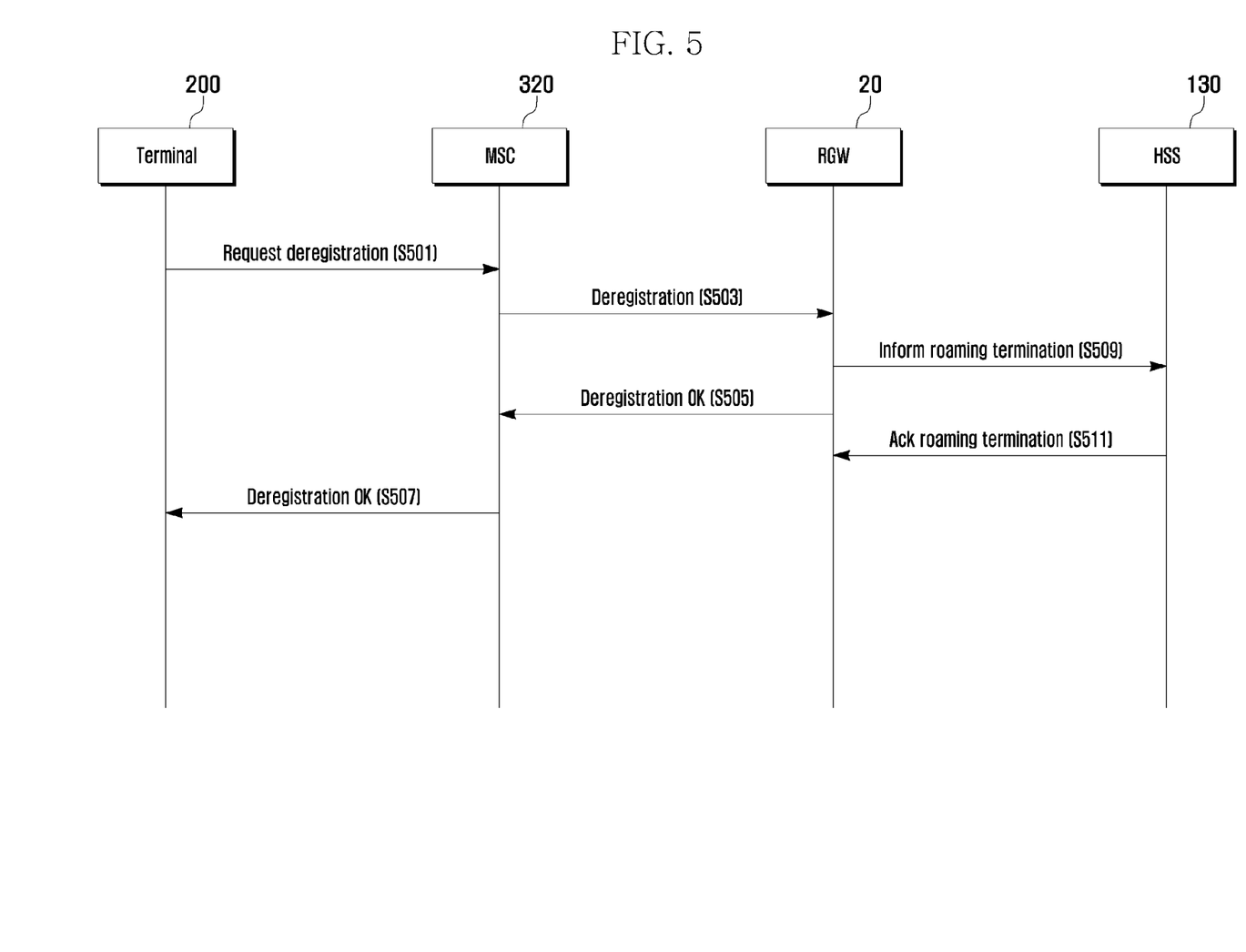
FIG. 5 is a scheme diagram illustrating a roaming service terminating method according to an exemplary embodiment of the present invention.

Hereinafter, a procedure terminating a roaming service according to an embodiment of the present invention will be described.

FIG. 5 is a scheme diagram illustrating a roaming service terminating method according to an exemplary embodiment of the present invention.

Referring to FIG. 5, it is assumed a terminal 200 terminates a roaming service while receiving a roaming service from the CS network 30. To do this, the terminal 200 requests deregistration to the CS network 30 (S501). At this time, the terminal 200 provides its ID information to the MSC 320. In this case, ID used when the terminal 200 is registered in the CS network 30 is used as the ID information of the terminal.

When the MSC 320 receives the deregistration request, it transfers the received deregistration request to the RGW 20 (S503).

When the RGW 20 receives the deregistration request, it recognizes that the terminal 200 is registered in a roaming state based on ID information of the terminal 200 and terminates registration of the terminal. That is, the MSC 320 removes a service profile stored upon registration of a corresponding terminal to manage the corresponding terminal in a deregistration state in the CS network 30.

Next, the RGW 20 provides a deregistration OK message indicating that deregistration is performed to the MSC 320 (S505). Accordingly, the MSC 320 provides a deregistration OK message indicating that deregistration is performed to the terminal 200 (S507).

After receiving the deregistration request at step S501 or receiving the deregistration OK message from the RGW 200 at step S505, the MSC 320 may remove a service profile received upon a registration procedure of the corresponding terminal 200.

In the meantime, the RGW 200 provides a Deregistration Indication informing that roaming of a corresponding terminal is terminated in the CS network is terminated to the HSS 130 (S509). Accordingly, the HSS 130 recognizes that the corresponding terminal is not in a roaming state and changes a state of the corresponding terminal from a roaming state to a non-roaming state. Next, the HSS 130 provides a message indicating that a corresponding terminal acknowledges termination roaming to the RGW 20 (S511). After receiving the deregistration request, the RGW 20 performs steps S509 and S511 regardless of an order of a deregistration procedure of the CS network 30.

As is evident from the above explanation, in an embodiment of the present invention, the RGW 20 may connect the PS network 10 with the CS network 30 and function as the HLR 310 of the CS network 30, thereby providing a roaming service without changing a configuration of the CS network 10.

Accordingly, a user may call in a PS network and CS networks 10 and 30 of another zone and another enterpriser. When a packet service network enterpriser and a CS network enterpriser contract a roaming agreement to provide a voice service, a terminal user may receive a roaming service between a PS network and CS networks 10 and 30 in a different zone or a different enterpriser throughout the world.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A communication network system providing an inter-network roaming service, comprising:
   a packet service network providing a packet based service;
   a circuit service network providing a circuit based service; and
   a roaming gateway acquiring and authenticating a service profile of a first terminal from the packet service network when the first terminal requests registration to the circuit switching network, and converting the service profile into a protocol of the circuit service network and providing the converted service profile such that the circuit service network registers an updated location of the first terminal, wherein the packet service network and the circuit service network are physically distinct networks.

2. The communication network system of claim 1, wherein the roaming gateway acquires routing information from the circuit service network and provides the acquired routing information to the packet service network when a second terminal of the packet service network requests call connection to the first terminal to the packet service network.

3. The communication network system of claim 1, wherein the packet service network comprises a media gateway controller requesting call connection to the circuit service network using a roaming number to perform the call connection.

4. The communication network system of claim 1, wherein the roaming gateway removes the service profile, when the first terminal of the packet service network requests deregistration to the circuit service network, to terminate registration of the first terminal in the circuit service network.

5. The communication network system of claim 4, wherein the roaming gateway informs the packet service network of deregistration of the first terminal in the circuit service network.

6. A method for providing a roaming service between a packet service network providing a packet based service and a circuit service network providing a circuit based service, the method comprising:

requesting registration in the circuit service network by a first terminal of the packet service network;

requesting authentication of the first terminal to a roaming gateway by the circuit service network; and acquiring and authenticating a service profile of the first terminal from the packet service network, and converting the acquired service profile into a protocol of the circuit service network and providing the converted service profile by the roaming gateway such that the circuit service network registers an updated location of the first terminal, wherein the circuit service network and the packet service network are physically distinct networks.

7. The method of claim 6, further comprising:

requesting routing information to the roaming gateway by the packet service network when a second terminal of the packet service network requests call connection to the first terminal to the packet service network; and acquiring routing information from the circuit service network by the roaming gateway and providing the acquired routing information to the packet service network.

8. The method of claim 7, further comprising requesting call connection to the circuit service network using a roaming number to perform the call connection by a media gateway controller of the packet service network.

9. The method of claim 6, further comprising removing the service profile, when the first terminal of the packet service network requests deregistration to the circuit service network, to terminate registration of the first terminal in the circuit service network.

10. The method of claim 9, further comprising informing the packet service network of deregistration of the first terminal in the circuit service network by the roaming gateway.

* * * * *